April 27, 1954    G. R. MALLORY    2,676,828
STORM SASH ADJUSTER ATTACHING MEANS
Filed Oct. 29, 1952

Inventor
GEORGE R. MALLORY
by: Fetherstonhaugh & Co.
Att'ys.

Patented Apr. 27, 1954

2,676,828

UNITED STATES PATENT OFFICE 2,676,828

STORM SASH ADJUSTER ATTACHING MEANS

George Raeburn Mallory, Blenheim, Ontario, Canada

Application October 29, 1952, Serial No. 317,451

Claims priority, application Canada January 25, 1952

5 Claims. (Cl. 292—263)

This invention relates to sash adjusters for swingable sashes.

Sash adjusters embodying two arms pivotally connected together at one end and having rotatable or swingable brackets connected to the opposite free ends thereof, are well known and are widely used. They provide for the swinging outward adjustment of storm sashes and, in some cases, casement windows as well. It is desirable in these structures, that at least one of the brackets be readily detachable so that in the case of storm sashes in particular, the adjuster can remain thereon when the storm sash is removed and leaving only this small bracket on the window frame.

A number of proposals have been made for rotatably locking the said bracket on its arm to perform this connecting and disconnecting function. In most cases, however, the locking means has many complications and disadvantages. Most of them embody a slidable, depressible or swingable member which is designed to engage with a stud on the bracket to hold the latter in rotatable engagement therewith and movable to release the stud. However, they have usually been somewhat difficult to actuate and in many cases, the form of construction has been such that the utility of this securing means is not obvious nor is its mode of operation immediately perceptible, with the result that in many cases, the user does not appreciate that the bracket is disconnectable.

The present invention overcomes these disadvantages of the prior art and provides a disconnectable locking and securing means which is particularly simple, economical and practical, while providing a combination, the function and utility of which is readily perceptible.

According to the invention, one arm of the adjuster is designed to carry a swingable locking lever, pivotally connected intermediate its ends to said arm, with the outer end of the lever located adjacent to the free end of the arm wherein the latter is provided with an orifice for receiving the stud of the bracket and said lever is formed with a notch in its side edge adjacent its outer end, designed substantially to register with the orifice in said arm when swung to a locking position directly overlying said arm; the stud of the bracket having means in connection therewith engageable by the defining edges in the notch of the lever when in normal locking position to retain the stud in rotatable engagement with said arm. The combination also includes means co-operating between the arm and the lever for retaining the latter in normally locked position and said arm is formed with a recess in an edge thereof, exposing a portion of said lever for ready flexing of the latter when in the normally locked position, the lever being capable of flexing and pivotally movable from co-operative locking engagement with said stud to release the latter. The lever is also formed with a reduced operating end, where the arm carrying it is formed with a side flange, to permit unrestricted swinging movement of the lever from locked to unlocked position.

The invention will be clearly understood by reference to the following detailed specification taken in conjunction with the accompanying drawings, in which.

Figure 1:
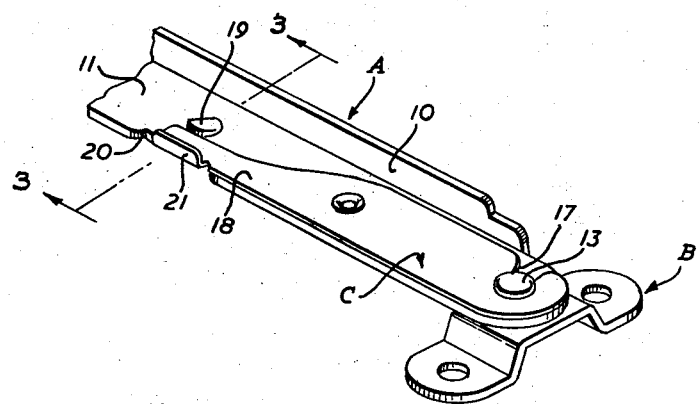
Figure 1 is a perspective view of a portion of an arm of a sash adjuster illustrating the means of securing the removable bracket to its free end and showing said means in the locked position.

Referring to the drawings, A indicates one arm of the sash adjuster and B indicates the bracket designed to be rotatably and detachably carried by the free end of arm A. The opposite end of arm A is, in the usual course, pivotally connected to a corresponding end of another similar arm as is well understood. The arms of the adjuster are generally formed with a marginal flange 10 for strengthening purposes and which projects at right angles to the flat strip body 11 thereof.

According to the invention, the free end of the arm is orificed as at 12 designed to receive freely therethrough, a stud 13 of a suitable bracket 14. In the preferred form of construction, the stud is reduced intermediate its ends by means of a circumferential groove 15 which exposes a narrower shank 16; thus, when the stud 13 is projected freely through the orifice 12, the shank 16 projects beyond the surface of the arm surrounding the orifice.

On the flat body 11 of the arm A, a swingable lever C is pivotally connected intermediate its ends and in such manner as to dispose one end of the lever adjacent the free end of the arm. This end of the lever is provided with a notch 17 in one side edge thereof at a point substantially to register with the orifice 12 of arm A when said lever is swung to normal locking position such as illustrated in Figure 1. The width of the notch is slightly less than the diameter of the orifice 12 so that the notch can straddle the shank 16 of the stud 13 when the latter is projected in the orifice 12 and the edges of the notch will enter the groove 15, thus retaining the stud in free rotatable connection with the free end of arm A.

Figure 2:
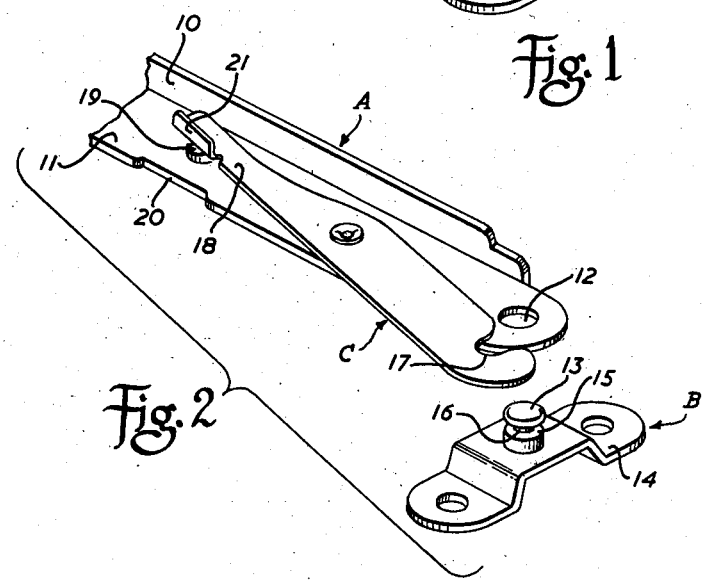
Figure 2 is a similar view to Figure 1, illustrating the locking means in unlocked position and the bracket released from the end of the arm.
Figure 3:
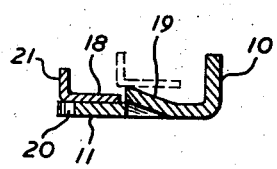
Figure 3 is a section taken substantially along the line 3—3 of Figure 1.

The lever C is preferably formed of reasonably flexible thin metal and its opposite end is reduced in width to form in effect, a shank 18 narrower than the width of the remainder of the lever, the reduction in width being effected from one side of the lever. Therefore, in the normal locked position of the lever as shown in Figure 1, one side edge of the lever including the shank 18 will lie substantially flush with the inner edge of arm A and in this position the shank 18 of the lever will be engaged by the shoulder of a boss 19 which may be struck from the arm A, thus retaining the lever against swinging movement and this retains it in the locking position. However, the inner edge of the arm A is recessed as at 20 in an area coinciding with the free end of shank 18 so that in this area, a portion of the free end of shank 18 will be exposed and partially engageable, by the digit of a hand, from the opposite side of arm A. This will be appreciated from a consideration in particular of Figures 1 and 3. Therefore, having regard to the flexible character of the lever, it will be appreciated that a slight pressure against the end of the shank 18 from the opposite side of arm A will cause it to tend to rise and at the same time, swing inwardly as the end of this shank rises above the shoulder of boss 19. Therefore, in a very simple pressure engagement of the shank, the lever is automatically swung to the position shown in Figure 2 which swings the opposite notched end thereof away from registration with orifice 12 of the arm to release the stud 13 of bracket 14. Obviously, in a simple operation, the lever can be swung back in an opposite direction to secure the stud 13 when it is again projected into the orifice 12. Preferably, a side edge of the shank 18 is formed with a small flange 21 to assist in this operation of lever C. Moreover, it will be noted that the reduced shank of the lever C permits a full swinging movement of the lever to the unlocked position and is necessary where a reinforcing flange such as 10 is employed on the arm of the adjuster.

It is apparent that the locking means described is simple in construction, readily operable and involves no projecting parts within the confines of the arm, namely, width of arm and depth of reinforcing flange. Moreover, it is also apparent that the structure in question, by reason of its simplicity, is practical and economical. Finally, its purpose and complete utility are manifestly evident from a mere glance at the structure involved.

What I claim as my invention is:

1. In a sash adjuster for swingable sashes, having arms pivotally connected together at one end and attaching brackets pivotally connected to the opposite free ends of said arms wherein one of said brackets is detachably connected to its arm, means for detachably connecting said bracket comprising in combination: a swingable locking lever pivotally connected intermediate its ends to said arm, the outer end of said lever being located adjacent the free end of said arm, the latter having an orifice therein and said lever having a notch in its side edge adjacent its outer end designed substantially to register with the orifice in said arm when swung to a locking position and directly overlying said arm, said bracket having a stud projecting therefrom slidably receivable in the orifice of said arm and having means in connection therewith engageable by the edges of the notch in said lever when in normal locking position to retain the stud in rotatable engagement with said arm, means co-operating between said arm and said lever for retaining the latter in normally locked position, said arm having a recess disposed in an edge thereof exposing a portion of said lever, when in the normally locked position, for engagement by the digit of a hand, said exposed portion of the lever being capable of flexing from engagement with said co-operating retaining means and swingable from co-operative locking engagement with said stud to release said bracket.

2. In a sash adjuster as claimed in claim 1 wherein said arm is formed with a marginal strengthening flange, said locking lever being formed with a reduced shank to dispose the edge of said shank nearest said flange, in spaced apart relation to the latter, said shank being swingable from normal locking position, towards said flange sufficiently to disengage the slotted portion of said lever from said stud of the bracket to release said bracket.

3. Sash adjusting means for swingable sashes as claimed in claim 2, in which the locking lever is flanged in an area substantially registering with the recessed portion of said arm, to facilitate operation of the locking lever to and from normal locking position.

4. Sash adjusting means for swingable sashes as claimed in claim 1, in which the locking lever is flanged in an area substantially registering with the recessed portion of said arm, to facilitate operation of the locking lever to and from normal locking position.

5. In a sash adjuster for swingable sashes, having arms pivotally connected together at one end and attaching brackets pivotally connected to the opposite free ends of said arms wherein one of said brackets is detachably connected to its respective arm, means for detachably connecting said bracket comprising in combination: a swingable locking lever pivotally connected intermediate its inner and outer ends to said respective arm, the outer end of said lever being located adjacent the free end of said respective arm, means on the outer end of said lever for locking said bracket to said arm when said lever is in one position, means on said arm co-operating with means on the inner end of said lever for retaining said lever in said locking position, said arm having a recess disposed in an edge thereof exposing a portion of said lever, when in the normally locked position, for engagement by the digit of a hand, said exposed portion of the lever being capable of flexing from engagement with said co-operating retaining means and swingable from co-operative locking engagement with said stud to release said bracket.

References Cited in the file of this patent

UNITED STATES PATENTS

| Number | Name | Date |
| --- | --- | --- |
| 1,376,637 | Porter | May 3, 1921 |
| 1,641,551 | Rudberg | Sept. 6, 1927 |
| 2,311,687 | Olson | Feb. 23, 1943 |
| 2,312,475 | Petersen | Mar. 2, 1943 |
| 2,498,535 | Falk | Feb. 21, 1950 |